United States Patent
Yamaura et al.

(10) Patent No.: US 7,037,619 B2
(45) Date of Patent: May 2, 2006

(54) GAS DIFFUSION ELECTRODE AND FUEL CELL INCLUDING SAME

(75) Inventors: Kiyoshi Yamaura, Kanagawa (JP); Toshiaki Kanemitsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 40 days.

(21) Appl. No.: 09/964,910

(22) Filed: Sep. 27, 2001

(65) Prior Publication Data

US 2002/0110725 A1    Aug. 15, 2002

(30) Foreign Application Priority Data

Sep. 29, 2000    (JP) ............................ P2000-301407

(51) Int. Cl.
  *H01M 4/86*    (2006.01)
(52) U.S. Cl. ............................ 429/44; 429/12; 429/40
(58) Field of Classification Search ................ 429/12, 429/40, 44
  See application file for complete search history.

(56) References Cited

U.S. PATENT DOCUMENTS

| | | |
|---|---|---|
| 5,470,680 A | 11/1995 | Loutfy et al. |
| 5,861,222 A * | 1/1999 | Fischer et al. .................. 429/42 |
| 6,013,371 A * | 1/2000 | Hager et al. .................. 428/408 |
| 6,589,682 B1 * | 7/2003 | Fleckner et al. ............... 429/34 |
| 2002/0006539 A1 | 1/2002 | Kubota et al. |
| 2003/0048057 A1 * | 3/2003 | Oyama et al. .............. 313/311 |
| 2003/0203139 A1 * | 10/2003 | Ren et al. .................. 428/34.3 |

FOREIGN PATENT DOCUMENTS

| | | |
|---|---|---|
| EP | 0 226 911 A1 | 7/1987 |
| JP | 05166520 | 7/1993 |
| JP | 2000003714 | 1/2000 |

OTHER PUBLICATIONS

K. Kordesch et al., "Fuel Cells and Their Applications," VCH Publishers, Inc., New York, NY (2001).*

Che, Guangli; Lakshmi Brinda B.; Fisher, Ellen R.; Martin, Charles R.; *Carbon nanotubule membranes for electrochemical energy storage and production;* Nature: May 28, 1998, pp. 346-349.

* cited by examiner

*Primary Examiner*—Dah-Wei Yuan
(74) *Attorney, Agent, or Firm*—Bell, Boyd & Lloyd LLC (57) ABSTRACT

A fuel cell and method for preparation thereof, wherein the fuel cell is ready to manufacture, superior in cell performance, and includes a fuel electrode and an oxygen electrode facing each other with an electrode film positioned between the fuel electrode and the oxygen electrode, wherein at least one of the fuel electrode and the oxygen electrode contain a fibrous, or needle-like carbonaceous material and are directly formed on the electrode film.

17 Claims, 8 Drawing Sheets

GAS DIFFUSION ELECTRODE AND FUEL CELL INCLUDING SAME

RELATED APPLICATION DATA

The present invention claims priority to Japanese Patent Document No. P2000-301407 filed on Sep. 29, 2000. The above refer Document is incorporated by reference to the extent permitted by law.

BACKGROUND OF THE INVENTION

The present invention relates to a fuel cell and a method for the preparation thereof.

A need exists for a substitute "clean" energy, which may take the place of a fossil fuel, such as petroleum. For example, the use of a hydrogen gas fuel as an alternative fuel source is desirable. Since hydrogen has a large energy contained per unit weight and, in use, does not emit obnoxious gases or gases contributing to global warming, it may be regarded as an ideal energy source (i.e., one which is clean and plentiful in supply).

Research advances relating to a fuel cell capable of recovering electrical energy from hydrogen continue to be developed. In this regard, expectations are high for the application of fuel cells to large scale power generation, on-site self-generation of power, a power source for an electric vehicle, or the like.

Typically, a fuel cell includes a fuel electrode, such as a hydrogen electrode, and an oxygen electrode, arranged on both sides of a proton conductor film (i.e., an electrode film or an electrolyte film). By supplying fuel (hydrogen) and oxygen to these electrodes, a cell reaction is induced to develop an electromotive force. In preparing the fuel cell, the proton conductor film, the fuel electrode and the oxygen electrode are routinely molded separately and bonded together.

In forming the fuel electrode and the oxygen electrode separately, a variety of inconveniences arise due to difficulties encountered in handling. For example, if the strength of the fuel electrode or the oxygen electrode is taken into consideration, a certain thickness, for example, a thickness of 100 µm or more, is needed. However, if the electrode thickness becomes larger, the cell reaction is lowered in efficiency, thereby lowering the cell performance. If, in order to evade this result, the electrode thickness is decreased, the electrolyte film cannot be handled as an independent film, thereby significantly lowering the production yield.

SUMMARY OF THE INVENTION

An advantage of the present invention is, therefore, to provide a fuel cell which is easy to manufacture and superior in cell performance, and a method for the preparation of the fuel cell.

Research has shown that when a fibrous carbonaceous (i.e., formed primarily of carbon) material, such as carbon nano-tubes, is entangled together to form a film structure, electrodes can be directly formed on an electrolyte film.

In an embodiment, the present invention provides a fuel cell having a fuel electrode and an oxygen electrode facing each other with an electrolyte film positioned between the electrodes. Preferably, the fuel electrode and/or the oxygen electrode contain a fibrous, or needle-like carbonaceous material and are directly formed on the electrolyte film.

In an embodiment, the present invention provides a method for preparing a fuel cell having a fuel electrode and an oxygen electrode facing each other with an electrolyte film positioned between the electrodes. Preferably, the method includes the step of forming a fuel electrode and/or an oxygen electrode, containing a needle-like material composed of carbon fibers or the like, directly on the electrolyte film by a spraying method, a dripping method, or other like process.

According to the present invention, in which the fibrous carbonaceous material is directly formed on the electrolyte film, thereby serving as a support, there is no need to separately handle the fuel electrode or the oxygen electrode, thereby negating the need to take the mechanical strength of the electrodes into consideration. Thus, the electrodes may be reduced in thickness, thereby resulting in a cell reaction that proceeds smoothly and improves cell performance.

Applicants have discovered that the fuel cell of the present invention is superior in performance and may be easily manufactured and produced as compared to conventionally known fuel cells. Moreover, utilizing a method for preparing the fuel cell, according to the present invention, negates the need for separately handling the fuel electrode or the oxygen electrode, thereby resulting in the elimination of complex operations while obtaining an appreciable improvement in the production yield.

Additional features and advantages of the present invention are described in, and will be apparent from, the following Detailed Description of the Invention and the Figures.

DETAILED DESCRIPTION OF THE INVENTION

Figure 1:
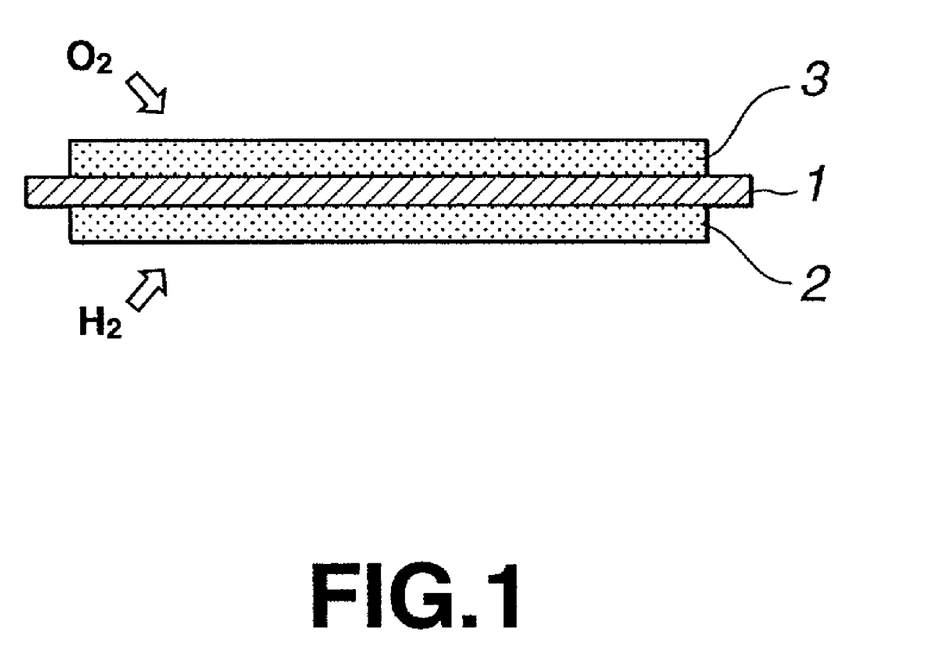
FIG. 1 shows a schematic cross-sectional illustration of a basic structure of a fuel cell in accordance with the principles of the present invention.

FIG. 1 shows a schematic cross-sectional illustration of a fuel cell in accordance with an embodiment of the present invention. In general, the fuel cell includes an electrode film 1, exhibiting ionic conductivity, and a fuel electrode 2 and an oxygen electrode 3, formed on both sides thereof.

If hydrogen, for example, is supplied to the fuel electrode 2, and oxygen is supplied to the oxygen electrode 3, cell reaction occurs to produce an electromotive force. In a direct methanol system, methanol may also be supplied as a hydrogen source to the fuel electrode 2.

Any suitable material exhibiting protonic conductivity may be used as the electrode film 1. For example, a proton conducting material may be coated on and carried by a separator for use as the electrode film 1. Preferably, the materials usable as the electrode or electrolyte film 1 include, for example, a high molecular weight material capable of conducting protons (hydrogen ions), such as perfluorosulfonic acid resin, for example, Nafion(R) manufactured by Du Pont KK. Other proton conductor materials can include polymolybdenic acids or oxides having a large number of hydrates, such as $H_3Mo_{12}PO_{40} \cdot 29H_2O$ or $Sb_2O_5 \cdot 5.4_2O$. If placed under wet conditions, these high molecular weight materials can exhibit high proton conductivity at or near ambient temperature.

Taking the perfluorosulfonic acid resin as an example, protons electrically dissociated from the sulfonic acid group are bound with the moisture taken in large quantities into the high molecular matrix by a hydrogen bond to generate protonated water, that is oxonium ions ($H_3O^+$), such that protons can be smoothly migrated in the high molecular matrix as oxonium ions. Thus, this type of matrix material may exhibit appreciably high proton conductivity even at or near ambient temperature.

Those skilled in the art will recognize that a proton conductor having a conduction mechanism different from that of the aforementioned materials may also be used. For example, composite metal oxides having a perovskite structure, such as Yb-doped SrCeO3, may also be used. Composite metal oxide structure have been found to exhibit protonic conductivity without needing moisture as the medium for migration. Thus, in composite metal oxides, the protons are conducted by channeling themselves through oxygen ions forming the skeleton of the perovskite structure.

A proton conductor composed of a carbonaceous material that forms a matrix structure, and having proton dissociating groups introduced therein, may also be used as the material for the proton conducting material forming the electrolyte film 1. "Proton dissociating groups" are functional groups from which protons ($H^+$) may be dissociated by electric dissociation. In an embodiment, the proton dissociating groups can include, for example, —OH, —$OSO_3H$, —$SO_3H$, —COOH, —$OP(OH)_2$, the like and combinations thereof. In this regard, protons are migrated through the proton dissociating groups to manifest ion conductivity.

Any suitable material, for example, a material composed primarily of carbon may be used as the carbonaceous material forming the matrix. However, it is necessary for the ion conductivity of the material to be higher than the electronic conductivity after introducing the proton dissociating groups. In an embodiment, a carbon cluster, as an aggregate of carbon atoms, or tubular carbon materials, or so-called carbon nano-tubes, can be used as the carbonaceous material. Among a variety of carbon clusters, fullerene, a fullerene structure having an opening end at least at a portion thereof, or a diamond structure, is preferred.

A cluster routinely is an aggregate of several to hundreds of atoms, bound or flocculated together. If these atoms are carbon atoms, such flocculation or aggregation improves proton conductivity while simultaneously holding chemical properties to provide for sufficient film strength and for ease in forming layers. A cluster composed primarily of carbon is an aggregate of several to hundreds of carbon atoms regardless of the types of carbon-carbon bonds. Such clusters may, however, not be composed entirely of carbon atoms, such that other atoms may be present with the carbon atoms. Thus, an aggregate of atoms, the major portion of which is composed of carbon atoms, is termed a carbon cluster. Examples of carbon clusters are shown in FIGS. 2 to 5, the proton dissociating groups being omitted. Thus, there is wide latitude for selection of types of proton conducting materials.

Figure 2:
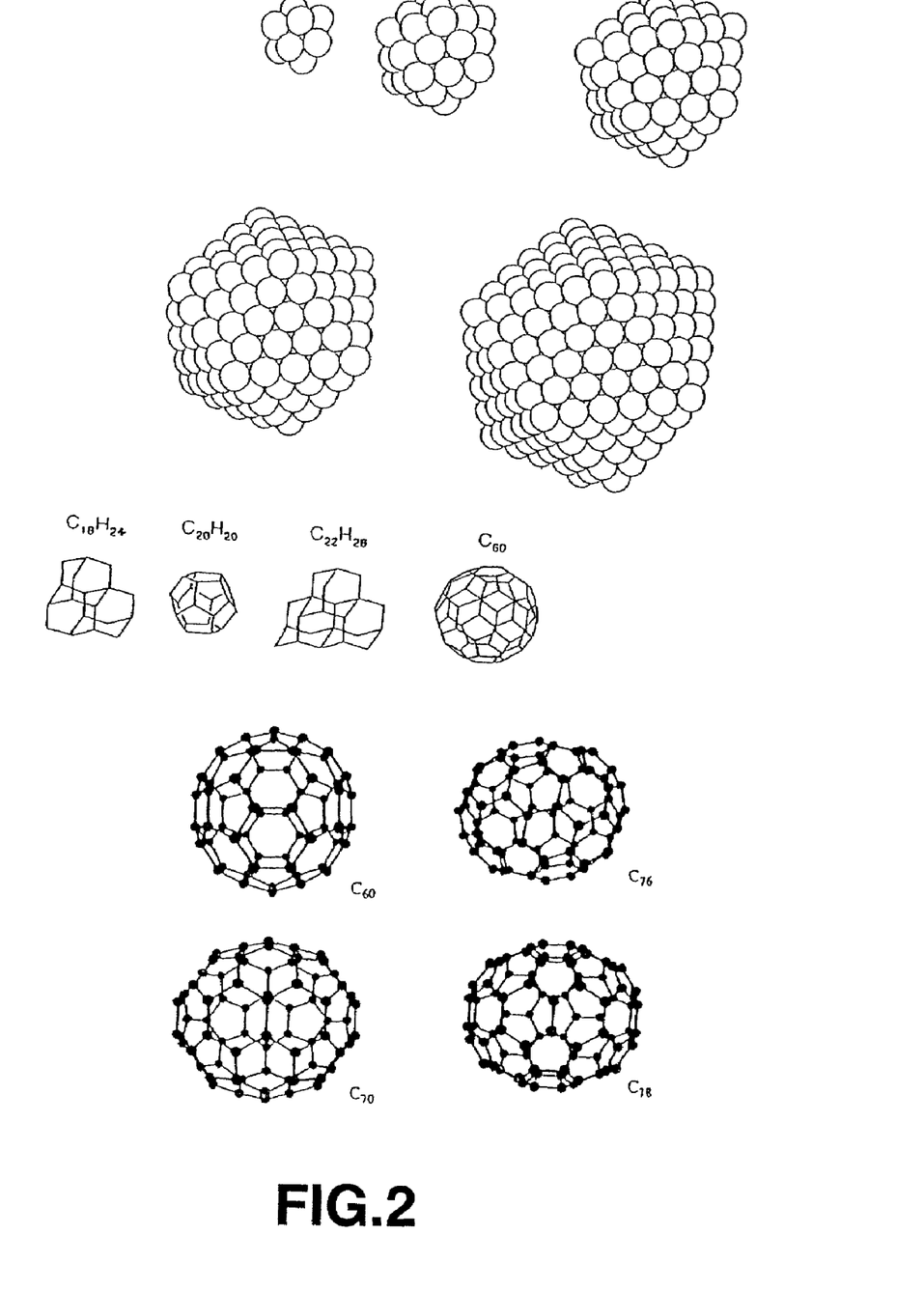
FIG. 2 shows a schematic illustration of various types of carbon clusters.
Figure 3:
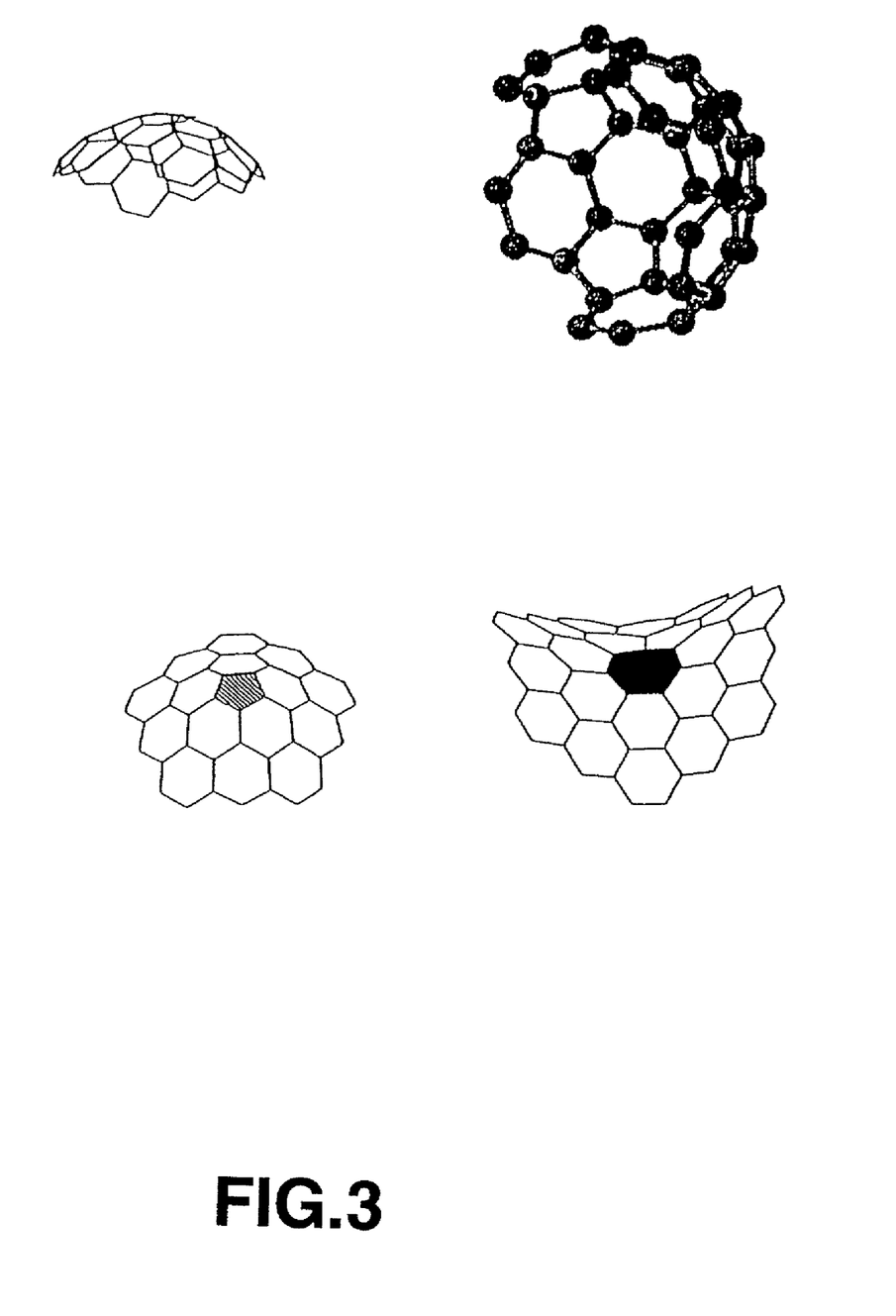
FIG. 3 shows a schematic illustration of various types of carbon clusters, particularly partial fullerene structures.
Figure 4:
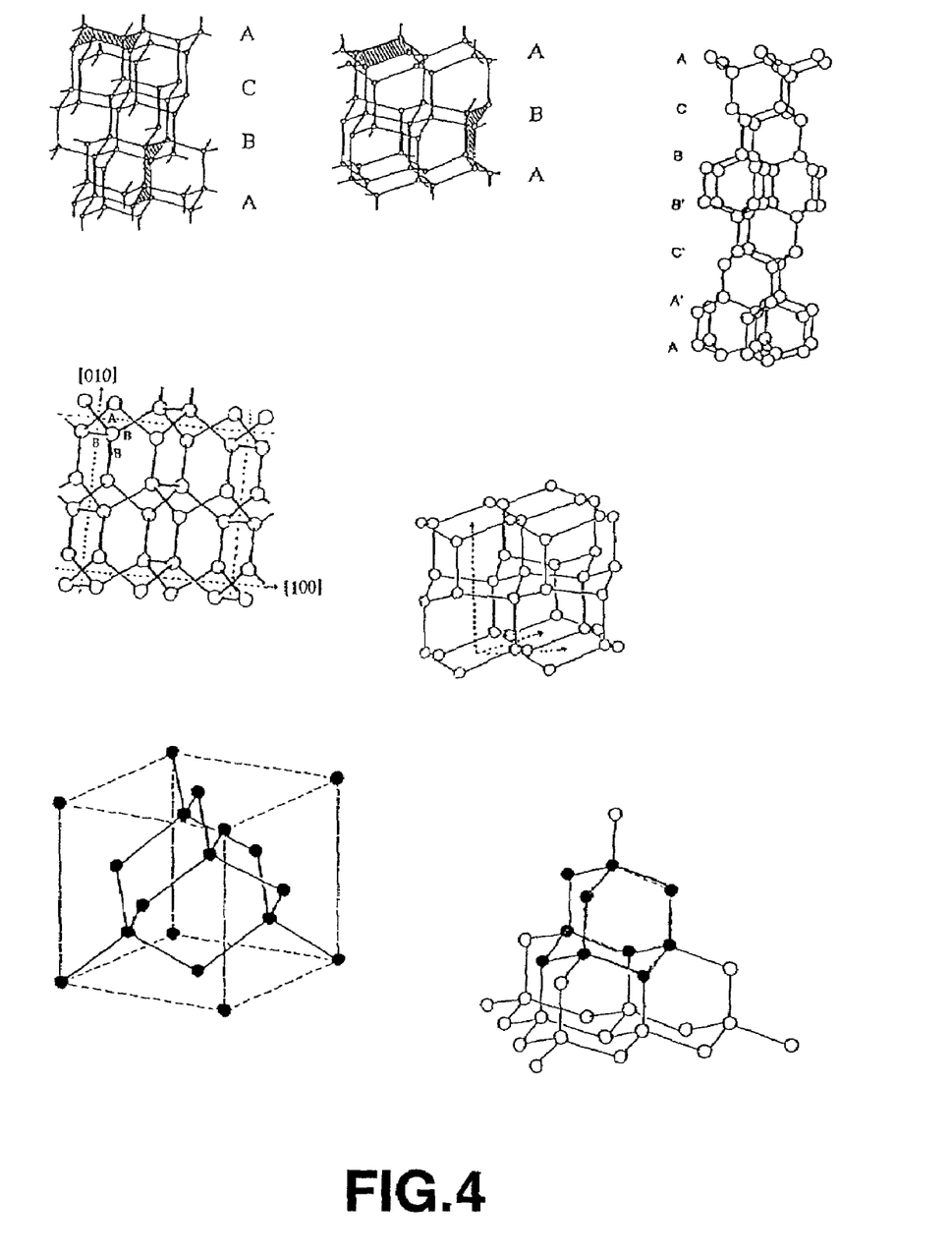
FIG. 4 shows a schematic illustration of various types of carbon clusters, particularly diamond structures.
Figure 5:
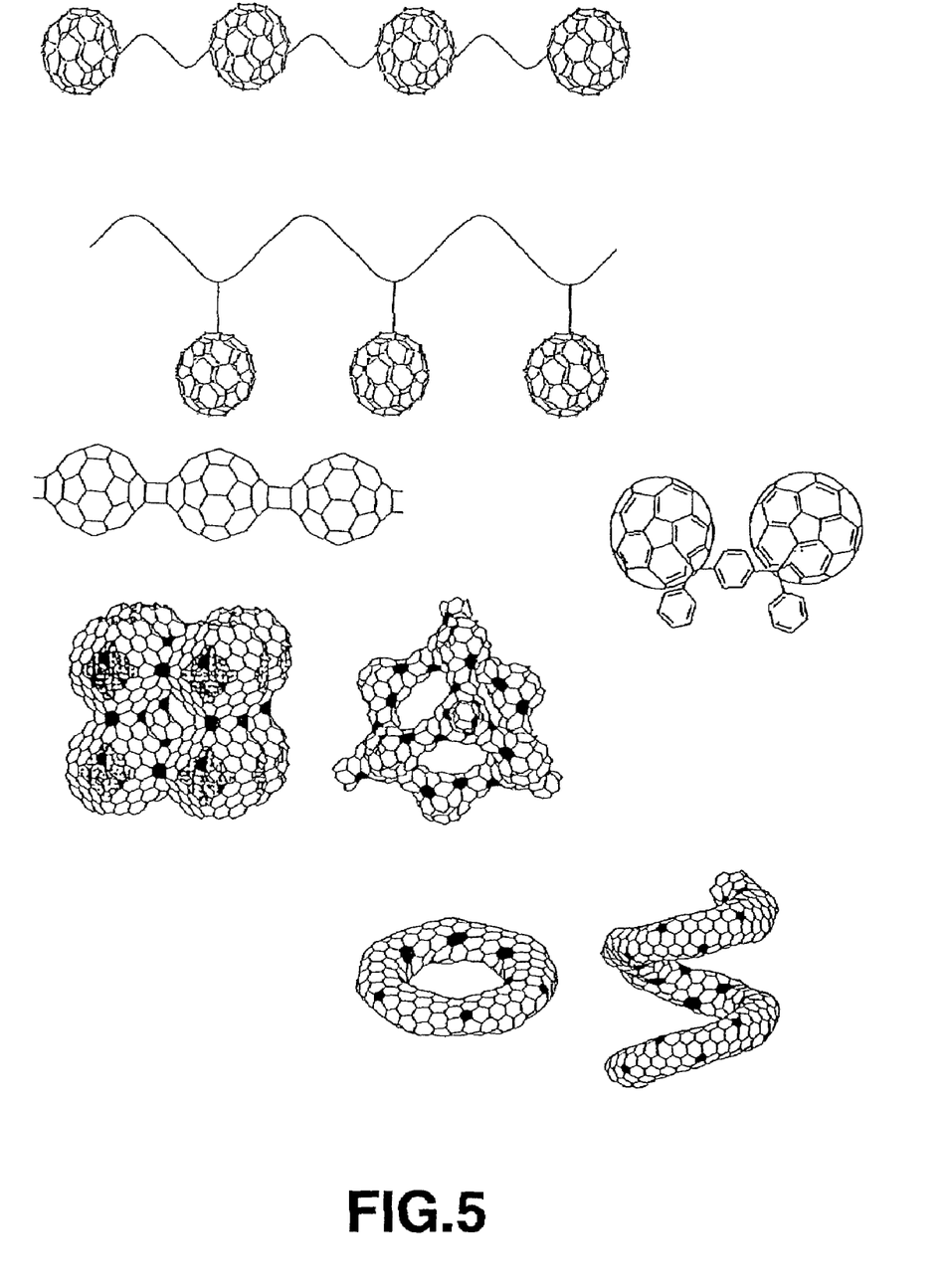
FIG. 5 shows a schematic illustration of various types of carbon clusters bonded together.

FIG. 2 shows a variety of carbon clusters, each composed of a large number of carbon atoms and each having the structure of a closed surface similar to that of a sphere, an elongated ball and the like. In FIG. 3, molecular fullerenes are also shown. FIG. 4 shows a variety of carbon clusters, the spherical structures of which are partially interrupted. These types of the carbon clusters feature open ends in the structures. A large number of such structures may be seen as by-products in the fullerene manufacturing process employing, for example, arc discharge. If the major portion of the carbon atoms of the carbon cluster are bound in an $Sp^3$ bond, a diamond structure can be produced, such as is shown in the structure of the various clusters shown in FIG. 4. FIG. 5 shows several examples where different clusters are bound together.

In the proton conductor containing, as a main component, the aforementioned carbonaceous material having proton dissociating groups, protons tend to be dissociated from the groups, even under dry conditions. Moreover, these protons are able to exhibit high conductivity over a wide temperature range including the ambient temperature, such as a temperature that ranges from at least from about 160° C. to about −40° C. Although this proton conductor can exhibit sufficient proton conductivity even in a dried state, the presence of the moisture may be tolerated, such as moisture that may intrude from outside the fuel cell due to environmental conditions.

According to an embodiment of the present invention, one or both of the fuel electrode 2 and the oxygen electrode 3 is directly formed on the electrode film 1. It should be appreciated that the electrodes can be composed of a variety of different and suitable materials or combinations thereof. In an embodiment, the electrodes include a needle-like, or fibrous carbonaceous material, such as carbon nanotubes, needle-like graphite (i.e. a graphite material having a fibrous structure), including vapor-grown carbon fibers (VGCF) manufactured by TOHO RAYON CO., LTD., like carbonaceous materials or combinations thereof FIG. 6 generally shows an arc discharge device used for the preparation of a carbonaceous material including carbon nano-tubes in an embodiment of the present invention. According to the present invention, a negative electrode 12 and a positive electrode 13, both made up of a rod of carbon, such as graphite, or the like can be arranged facing each other within a reaction chamber 11, such as a vacuum chamber. In an embodiment, there is a gap G separating the electrodes 12, 13. The rear end of the positive electrode 13 is connected to a linear movement introducing mechanism 14. The rear ends of the electrodes 13, 12 are connected to current introducing terminals 15a, 15b, respectively.

Figure 6:
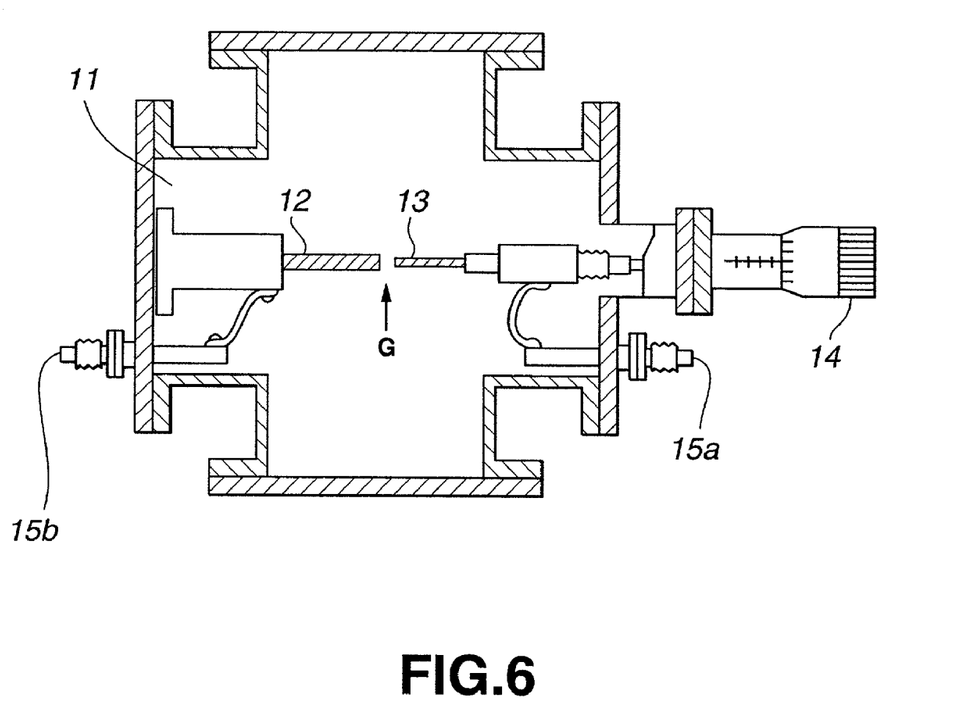
FIG. 6 shows a schematic illustration of a typical arc discharge device used for preparing carbon nano-tubes.

When, in the above arrangement, the inside of the reaction chamber 11 is evacuated and subsequently charged with rare gases, such as helium, and the DC current is supplied to the respective electrodes, an arc discharge is produced across the negative electrode 12 and the positive electrode 13 in an embodiment. Thus, a soot-like carbonaceous material is deposited on the inner surface of the reaction chamber 11 (i.e., on the sidewall surface, ceiling surface, on the bottom surface, other like surfaces or combinations thereof) and on the negative electrode 12. In an embodiment, if a small-sized vessel is attached to, for example, the sidewall surface, wherein the soot is also deposited therein.

Figure 7A:
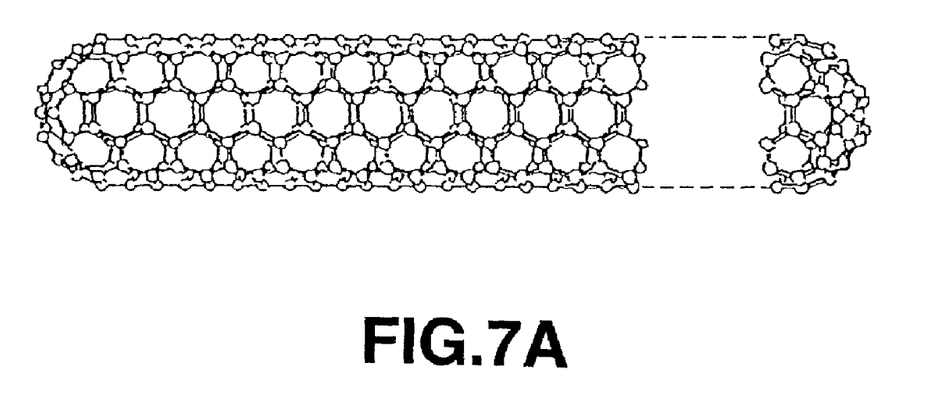
FIG. 7 shows a schematic illustration of various carbonaceous materials contained in a carbon soot manufactured by arc discharge.
Figure 7B:
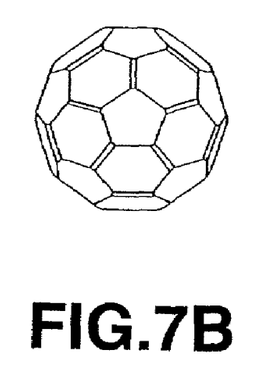
Figure 7C:
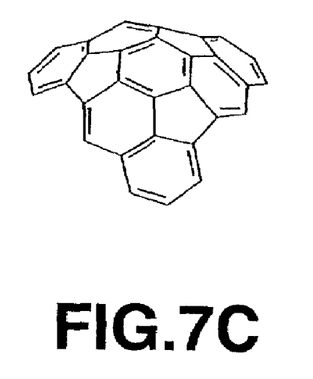

In the soot-like carbonaceous material, recovered from the reaction chamber 11, there can be contained a number of suitable materials including, for example, carbon nano-tubes shown in FIG. 7A, $C_{60}$ fullerene shown in FIG. 7B, $C_{70}$ fullerene (not shown), carbon soots shown in FIG. 7C, the like and combinations thereof Carbon soots are those having a curvature which obstructed the growth to fullerene molecules or carbon nano-tubes. A typical composition of soot-like carbonaceous material may be made up of 10% to 20% of fullerene, such as $C_{60}$ or $C_{70}$ and a few % of carbon nano-tubes, with the balance being substantially a large quantity of the carbon soot. It should be appreciated that any suitable type and amount of material can be utilized. In the above-described carbonaceous material, 20 wt % or less of a metal having a catalytic action of separating a hydrogen molecule to a hydrogen atom and further to a proton and to electrons may preferably be added by any suitable known method on at least a portion of the surface of the carbonaceous material. In an embodiment, the metal exhibiting a catalytic action can include, for example, platinum, platinum alloys, the like, or combinations thereof. If such catalytic metal is added, as described above, the efficiency of the cell reaction may be higher than otherwise.

In an embodiment, using the fibrous carbonaceous material described above, the fuel electrode 2 or the oxygen electrode 3 may be formed directly on the electrolyte film 1 by, for example, a spraying method, a dripping method, or other like process. In the spraying method, the aforementioned carbonaceous material is dispersed in water, in a solvent, such as ethanol, or in other like medium, and directly sprayed onto the electrode film 1. In the dripping method, the aforementioned carbonaceous material is similarly dispersed in water, in a solvent, such as ethanol, or in other like medium, and directly dripped onto the electrode film 1. Thus, an agglomeration of the aforementioned carbonaceous material is produced on the proton conductor film 1. Since, for example, the carbon nano-tubes are in the form of elongated fibers each approximately 1 nm in diameter and 1 to 10 μm in length, or, for example, the needle-like graphite is in the form of a needle or very fine fiber approximately 0.1 to 0.5 μm in diameter and approximately 1 to 50 μm in length, these types of carbonaceous material can be entangled or fitted together to form an optimum layered product without the necessity of using a binder. Of course, a binder may also be used as suitably desired.

In an embodiment, the fuel electrode 2 and the oxygen electrode 3, formed as described above, need not be independent films, and hence are not required to exhibit mechanical strength and may be of an extremely thin thickness of, for example, ranging from about 2 to about 4 μm. Also, Applicants have demonstrated that a fuel cell prepared by the above-described method may, for example, have an output of approximately 100 mW, 0.6V. Additionally, the electrode obtained by directly forming carbon nano-tubes and needle-like graphite on the electrolyte film 1, by the spraying method or by the dripping method can exhibit superior adhesion to the electrolyte film 1, while reducing the risk of peeling or removal therefrom.

Table 1 (below) shows the measured results of the peel back force test for an electrode with a different ratio of carbon nanotubes (CNT) and graphite fibrous material (VGCF), where R=VGCF/(CNT=VGCF) as compared to other materials. The frequency of occurrence of peeling S was measured by bonding an adhesive tape to a film of 9 cm² in area and by measuring the area of the tape left unpeeled on peeling. In Table 1, the values of the frequency of occurrence of peeling S in case of employing carbon black or graphite are also shown for comparison.

TABLE 1

|  | R | S (cm²) |
|---|---|---|
| CNT + VGCF | 0 | 9.0 |
|  | 0.1 | 9.0 |
|  | 0.2 | 8.3 |
|  | 0.3 | 8.0 |
|  | 0.5 | 6.1 |
|  | 1.0 | 4.0 |
| carbon black | — | 1.0 |
| graphite (3 μm) | — | 0.2 |

Thus, if carbon nano-tubes or needle-like graphite are used, the area left unpeeled is increased so that optimum bonding properties are exhibited. Conversely, if carbon black or graphite is used, the amount of the tape left after peeling is extremely small, thus indicating that the bonding properties fall short in using the tape as the electrode.

Figure 8:
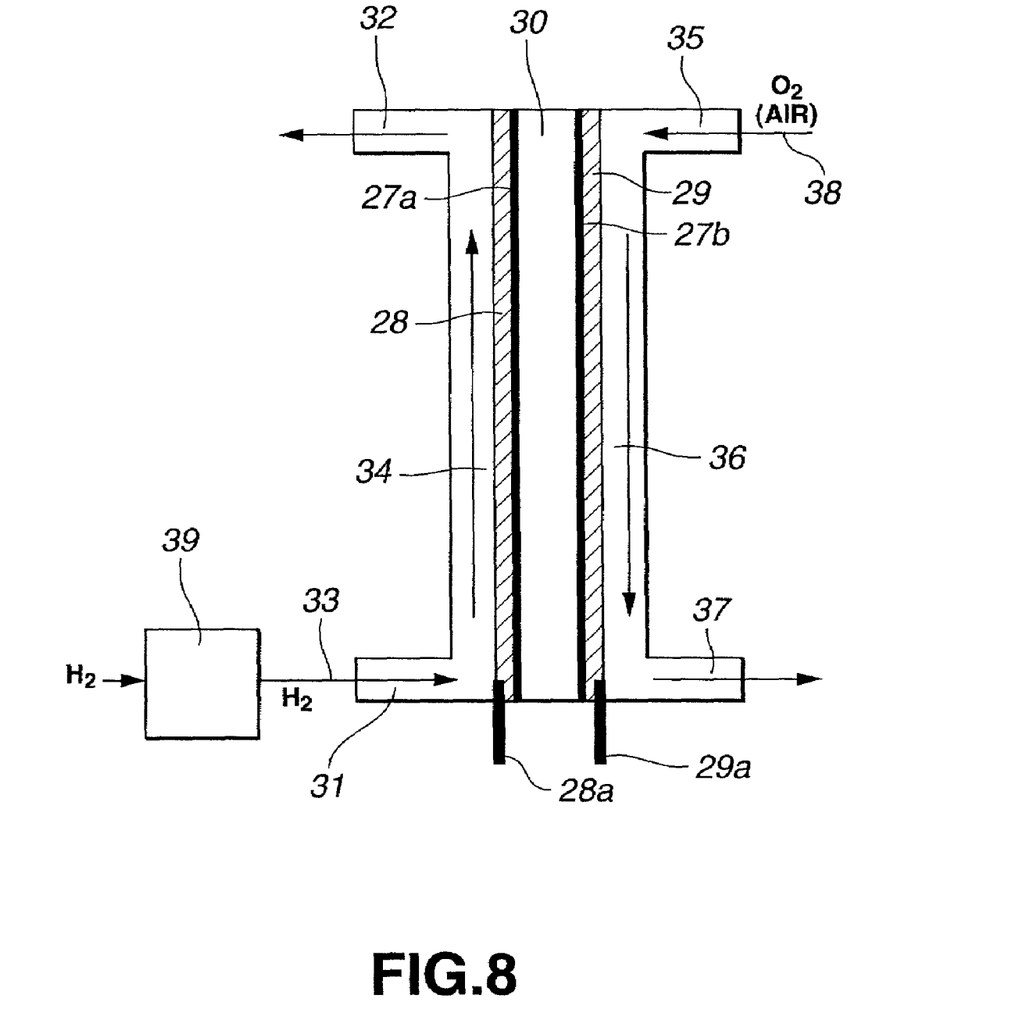
FIG. 8 shows a schematic illustration of a structure of a fuel cell in accordance with the principles of the present invention.

FIG. 8 shows a schematic illustration of a fuel cell in accordance with an embodiment of the present invention. In an embodiment, the fuel cell produced has an anode (fuel electrode or a hydrogen electrode) 28 and a cathode (oxygen electrode) 29, facing each other, a catalyst material having, for example, a metal component 27a, 27b intimately bonded, layered or dispersed, and a proton conductor unit 30 clamped between the electrodes. From the anode 28 and the cathode 29, terminals 28a, 29a are derived and connected to an external circuit (not shown).

In an embodiment, hydrogen is supplied in use at the side anode 28 with hydrogen via an inlet 31 and discharged at an outlet 32, which outlet may, however, be omitted, if so desired. As the fuel $H_2$ traverses a channel 34, protons are generated and traverse the proton conduction unit 30 to reach the cathode 29b where the protons react with oxygen (air) 38 supplied via inlet 35 to a channel 36 to proceed towards the outlet 37 to produce the electromotive force as desired.

In an embodiment, a carbonaceous material for hydrogen occlusion, alloys containing occluded hydrogen and a hydrogen tank are housed in a hydrogen supply source 39. The carbonaceous material may have hydrogen occluded therein at the outset and housed in this state in the hydrogen supply source 39 to supply hydrogen to the fuel cell.

Although the present invention has been described with reference to specific embodiments, those of skill in the art will recognize that changes may be made thereto without departing from the spirit and scope of the invention as set forth in the hereafter appended claims.

The invention claimed is:

1. A gas diffusion electrode operable within a fuel cell having a proton conductor, wherein the gas diffusion electrode is adhered directly to the proton conductor and consists essentially of a fibrous carbonaceous material, wherein the gas diffusion electrode comprises a thickness ranging from about 2 μm to about 4 μm.

2. The gas diffusion electrode as claimed in claim 1, wherein the fibrous carbonaceous material comprises carbon nanotubes.

3. The gas diffusion electrode as claimed in claim 1, wherein the fibrous carbonaceous material comprises vapor-grown carbon fibers.

4. The gas diffusion electrode as claimed in claim 1, wherein the fibrous carbonaceous material comprises a mixture of carbon nanotubes and vapor-grown carbon fibers.

5. The gas diffusion electrode as claimed in claim 4, wherein the mixture includes a ratio of carbon nanotubes to vapor-grown carbon fibers that ranges from about 0:1 to about 9:1.

6. A fuel cell, comprising:
   a first electrode and a second electrode facing the first electrode; and
   a proton conductor disposed between the first electrode and the second electrode, wherein at least one of the first electrode and the second electrode is adhered directly to the proton conductor and consists essentially of a fibrous carbonaceous material formed on the proton conductor, and wherein at least one of the first electrode and the second electrode comprises a thickness ranging from about 2 μm to about 4 μm.

7. The fuel cell as claimed in claim 6, wherein the fibrous carbonaceous material is selected from the group consisting of carbon nanotubes, vapor-grown carbon fibers and mixtures thereof.

8. The fuel cell as claimed in claim 7, wherein the fibrous carbonaceous material comprises a catalyst material in an amount of about 20% by weight or less.

9. The fuel cell as claimed in claim 8, wherein the catalyst material is selected from the group consisting of platinum and alloys thereof.

10. The fuel cell as claimed in claim 9, wherein the mixture includes a ratio of carbon nanotubes to vapor-grown carbon fibers that ranges from about 0:1 to about 9:1.

11. The fuel cell as claimed in claim 6, wherein the first electrode comprises a fuel electrode and the second electrode comprises an oxygen electrode.

12. A fuel cell, comprising:
   a first electrode, a second electrode, and a proton conductor disposed between the first electrode and the second electrode, wherein at least one of the first electrode and the second a electrode is adhered directly to said proton conductor and consists essentially of carbonaceous material selected from the group consisting of at least one type of carbon nanotube, a graphite fibrous material, and mixtures thereof, and wherein at least one of the first electrode and the second electrode comprises a thickness ranging from about 2 μm to about 4 μm.

13. The fuel cell as claimed in claim 12, wherein the carbonaceous material consists essentially of a mixture of the at least one type of carbon nanotube and a graphite fibrous material.

14. The fuel cell as claimed in claim 13, wherein the graphite fibrous material includes a vapor-grown carbon fiber.

15. The fuel cell as claimed in claim 14, wherein the mixture includes a ratio of the at least one type of carbon nanotube to the vapor-grown carbon fiber that ranges from about 0:1 to about 9:1.

16. The fuel cell as claimed in claim 4, wherein the mixture includes a ratio of the at least one type of carbon nanotube to the vapor-grown carbon fiber that ranges from about 1:1 to about 4:1.

17. The fuel cell as claimed in claim 13, wherein the carbonaceous material contains a catalyst material in an amount of about 20% by weight or loss.

* * * * *